July 11, 1950     D. D. R. MACKINTOSH     2,514,775
CHUCKING AND FEEDING APPARATUS
Filed Dec. 13, 1944     4 Sheets-Sheet 3
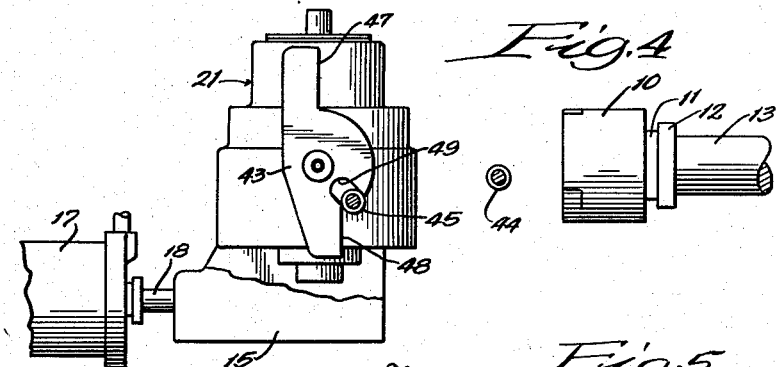
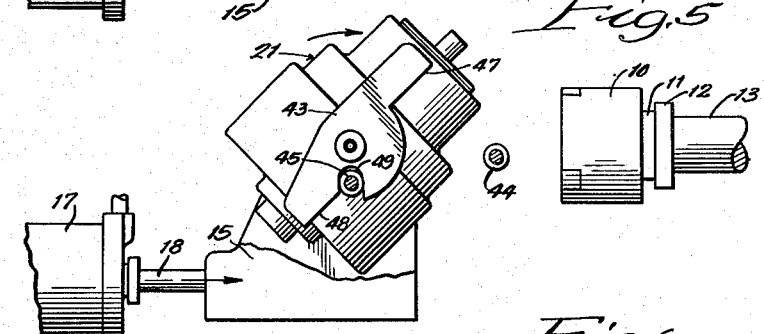
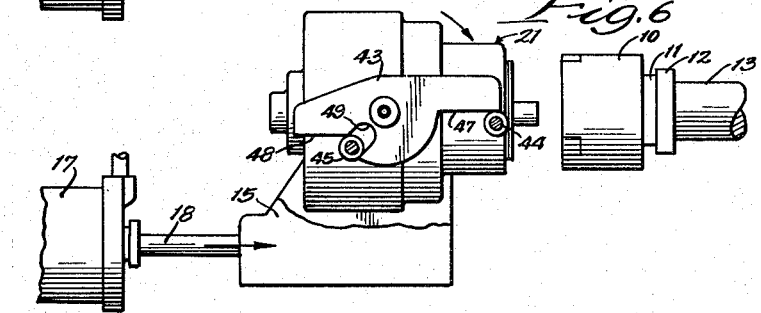
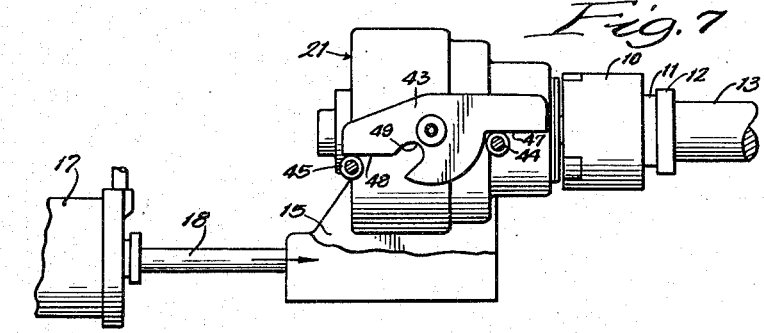
Inventor:
Donald D. R. Mackintosh,
By Dawson, Ooms & Booth,
Attorneys.

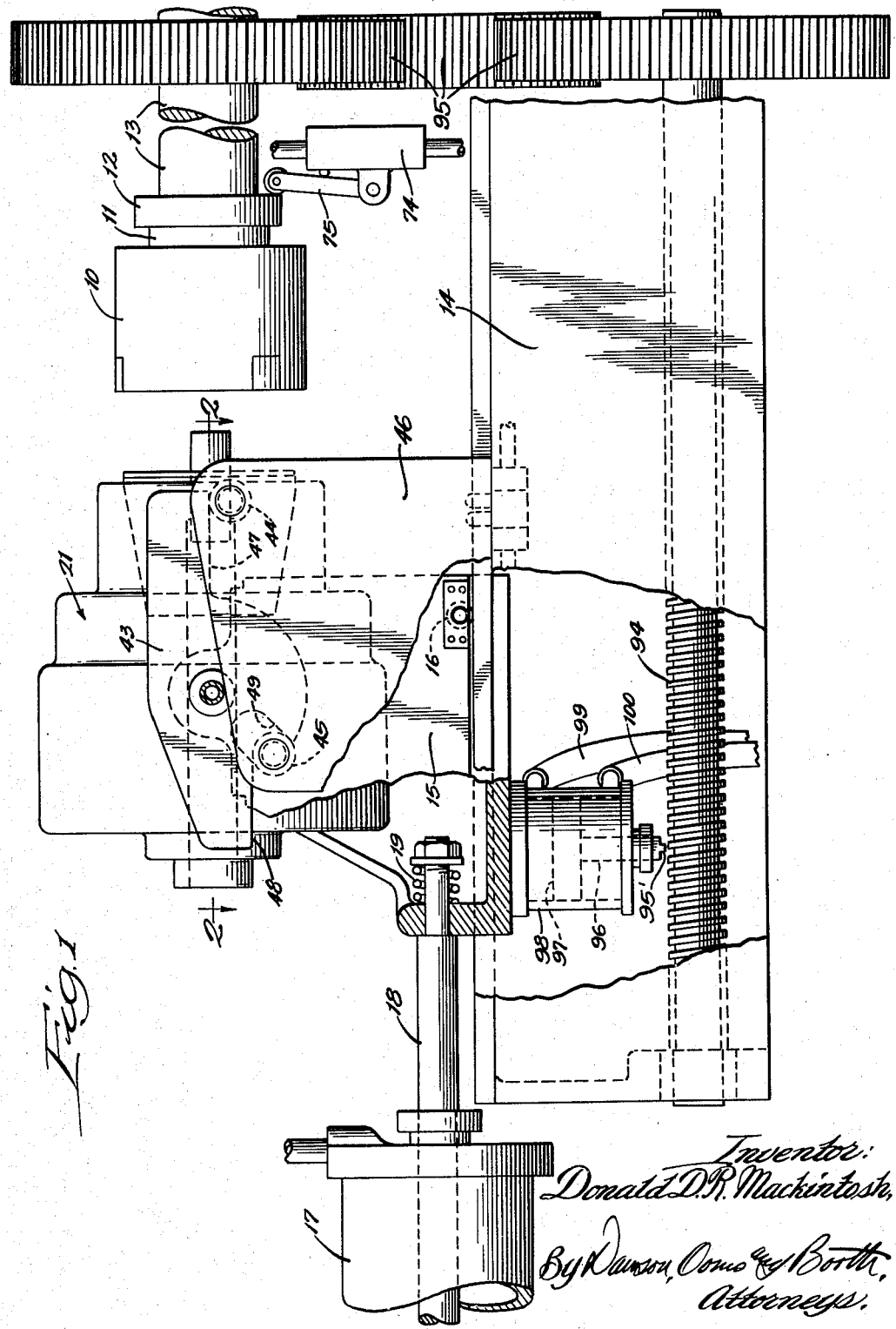

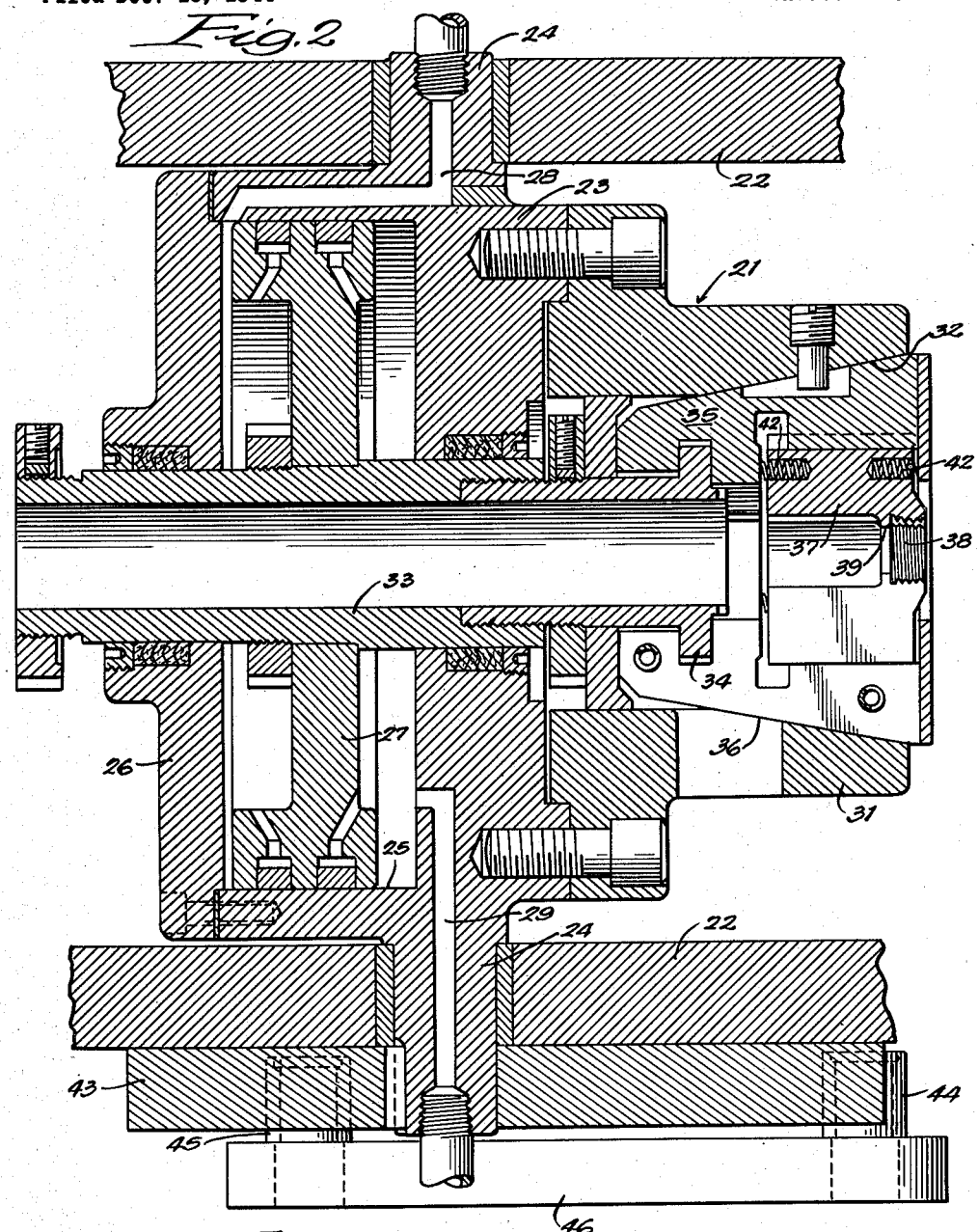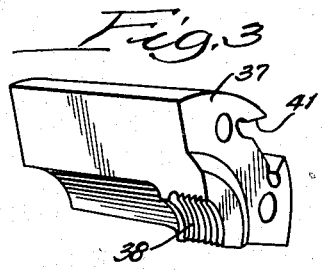

July 11, 1950  D. D. R. MACKINTOSH  2,514,775
CHUCKING AND FEEDING APPARATUS
Filed Dec. 13, 1944  4 Sheets-Sheet 4

Inventor:
Donald D. R. Mackintosh,
By Dawson, Ooms & Booth,
Attorneys.

Patented July 11, 1950

2,514,775

UNITED STATES PATENT OFFICE 2,514,775

CHUCKING AND FEEDING APPARATUS

Donald D. R. Mackintosh, Chicago, Ill., assignor to Chicago Nipple Manufacturing Company, a corporation of Delaware Application December 13, 1944, Serial No. 568,061

15 Claims. (Cl. 10—107)

This invention relates to chucking and feeding apparatus and more particularly to apparatus for supporting and feeding work pieces to a machining head in which the pieces are threaded or otherwise machined.

One of the objects of the invention is to provide a chucking and feeding apparatus in which a completed work piece may be released to drop by gravity from the chuck which holds it during the machining operation.

Another object is to provide a chucking and feeding apparatus including a pivotally mounted chuck which is held in a horizontal position to feed a work piece into the machining head and which is turned to a vertical position at the end of the machining operation for removal of the completed work piece for insertion of a new work piece blank.

Another object is to provide a chucking and feeding apparatus in which a work piece is positively fed into a threading head at a predetermined rate during the threading operation so that threads are accurately formed thereon.

Still another object is to provide a chucking and feeding apparatus which is automatically controlled to perform chucking, feeding, return and unchucking operations automatically in sequence.

A further object of the invention is to provide a chucking and feeding apparatus in which a work piece is fed rapidly from a loading to a machining position and slowly during the machining operation.

A still further object is to provide a chucking and feeding apparatus in which the threaded end of a short work piece may be firmly and accurately gripped during the threading operation without damage to the threads.

The above and other objects and advantages of the invention will be more readily apparent from the following description, when read in connection with the accompanying drawing, in which—

Figure 1 is a partial side elevation with parts broken away and in section of a threading machine embodying the invention;

Figure 2 is an enlarged section of the chuck on the line 2—2 of Figure 1;

Figure 3 is a perspective view of a gripper for holding the threaded end of a nipple;

Figure 8:
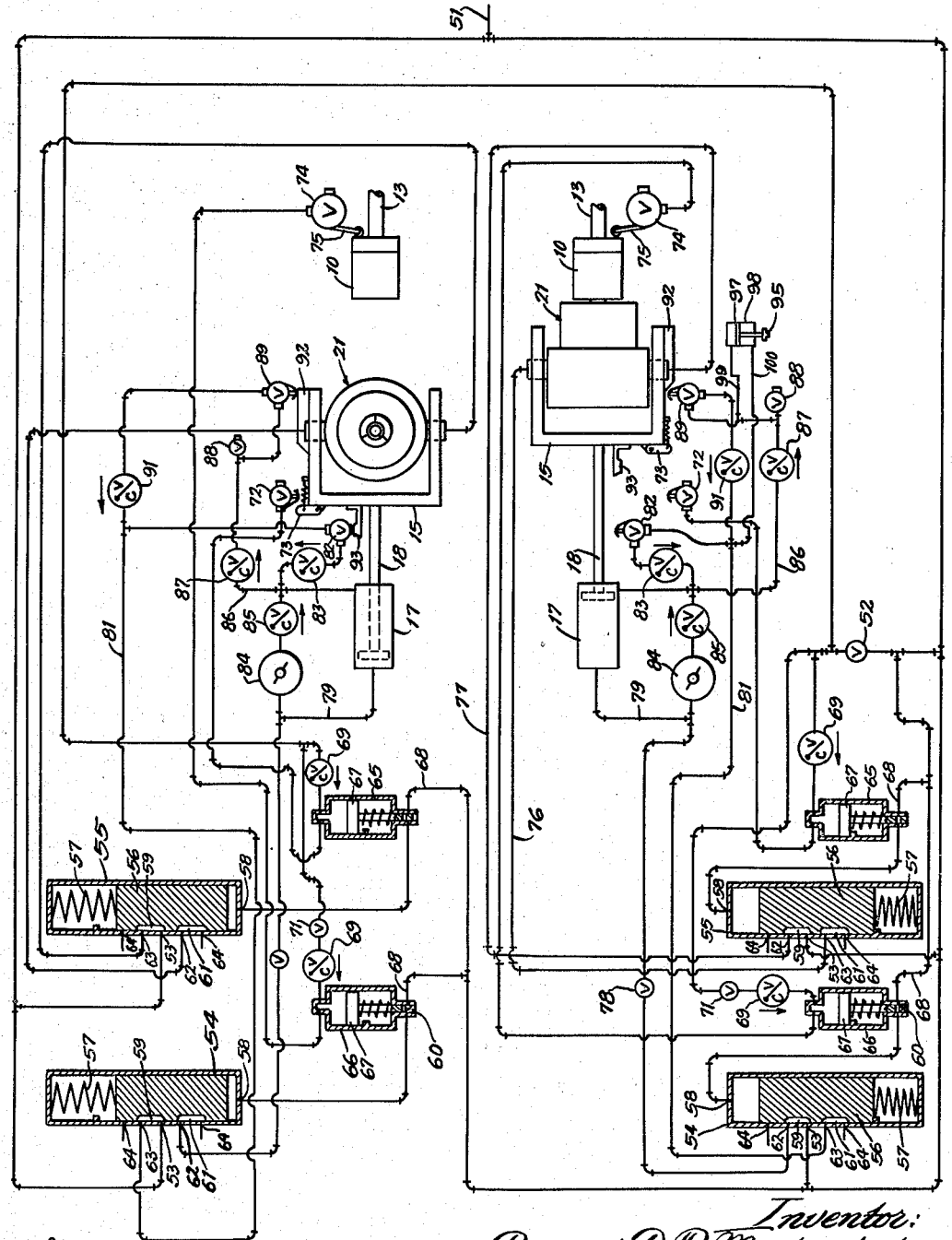

Figures 4 to 7 inclusive are partial diagrammatic views illustrating the sequence of operations; and Figure 8 is a diagrammatic view of the control system.

The invention is specifically shown and described in connection with a nipple threading machine but it will be understood that it could be used with machines for performing various other types of operations equally well.

The machine as best seen in Figure 1 comprises a threading head 10 which may be of standard construction containing the usual contractable dies or chasers not shown. A sleeve 11 terminating in a collar 12 is carried by the head to be engaged by the end of a nipple at the completion of a threading operation so that the sleeve will be moved outwardly of the head to retract the dies. The entire head is carried by a shaft 13 driven thru any suitable power means. The head is supported above a fixed base 14 provided with parallel ways on which a support 15 is slidably mounted for movement toward and away from the head. The support 15 may be mounted on the ways in any desired manner, as for example, thru anti-friction rollers 16 so that it may be moved easily in a line parallel to the axis of the head. The support is adapted to be moved by power means shown as including a cylinder 17 fixedly mounted with respect to the base 14 and having a piston therein whose rod 18 is connected to the support. As shown, the rod 18 has a reduced end extending thru an opening at the rear of the support and connected to the support thru a spring 19 to permit relative movement between the piston rod and the support.

The support pivotally carries a chuck 21 which is adapted to hold a nipple blank to be threaded. As best seen in Figure 2, the support is formed with upstanding side plates 22 between which the chuck is pivotally mounted on a horizontal axis to be tilted between vertical and horizontal positions. The chuck comprises a body casting 23 having stub shafts 24 projecting from diametrically opposite points thereon and journalled in aligned bearings in the side plates 22. The casting 23 is formed with a cylindrical cavity 25 closed by an end plate 26. A piston 27 is slidable in the cavity and is adapted to be moved therein by fluid supplied thru passages 28 and 29 extending thru the stub shafts 24.

The main casting 23 carries at one end a tubular extension 31 terminating on its inner surface in a conical cam portion 32. A tubular stem 33 having an internal diameter greater than the outside of the nipples to be threaded is rigidly connected to the piston 27 and is formed with an annular flange 34 fitting into complementary notches in jaw members 35. The outer surface of the jaw members is tapered as indicated at 36 to cooperate with the cam surface 32 so that when the jaw members are moved to the left as seen in Figure 2, they will be cammed inward to engage and grip a nipple.

Any desired type of grippers for holding nipples to be threaded may be carried by the jaw members depending upon the type of nipple blank. For plain nipple blanks the grippers may have partially cylindrical surfaces which are slightly roughened to engage the outer surface of the blanks and hold them firmly during a threading operation. As shown in Figures 2 and 3, the jaws carry specially shaped grippers 37 to engage and support the threaded ends of short nipples. The grippers 37 are formed at their outer ends with threaded surfaces 38 terminating in inwardly projecting shoulders 39 to limit inward movement of the nipples therein. The grippers are formed with tapered slots 41 on their outer surfaces which fit over complementary projections on the inner surfaces of the jaws so that the grippers are slidably supported by the jaws. As seen in Figure 2, the grippers are slightly shorter than the jaws and are drilled at their opposite ends to receive springs 42 which tend to center the grippers in the jaws.

When the threaded end of a short nipple is inserted in the grippers, it is preferably held in a position in which its inner end is above the shoulders 39. When the grippers are cammed in toward the nipple the threads 38 will engage the nipple threads and the grippers can move longitudinally slightly against the springs 42 so that the threads will engage properly without damaging the threaded end of the nipple. When the threading operation on the projecting end of the nipple is started the nipple will be threaded into the grippers until its inner end engages the shoulders 39 at which time it will be held firmly against rotation. Upon completion of a threading operation the jaws are moved to the right so that they will spread and release the nipple upon which it can drop thru the stem 33 into a bin or other desired receiver.

The chuck is guided during its movements toward and away from the threading head by guide means shown as including a cam plate 43 secured to one of the stub shafts 24 and cooperating with spaced rollers 44 and 45 carried by a plate 46 which is fixed to the base 14. The cam plate 43 is formed with a forward straight surface 47 adapted to engage the roller 44 at the same time a rear straight surface 48 on the cam engages the roller 45 so that the chuck will be held against turning. At the forward end of the surface 48 angular slot 49 is formed in the cam plate into which the roller 45 may move to tilt the chuck.

The sequence of operations is indicated in Figures 4 to 7. Figure 4 shows the chuck in the position it will occupy when the support 15 is fully retracted. At this time the roller 45 will lie in the notch 49 and will have tilted the chuck to a position with its axis vertical. As the support starts to move forward to the position shown in Figure 5, the roller 45 acting on the notch 49 will tilt it clockwise until it reaches the horizontal position shown in Figure 6. At this time the surfaces 47 and 48 will be in engagement with the rollers 44 and 45 respectively to hold the chuck horizontal. The rollers will remain in engagement with these surfaces during the remainder of the feeding and threading operations to maintain the chuck horizontal until it has reached its full forward position as shown in Figure 7. Upon a reversal of the operation to move the support and chuck away from the head, the chuck will be held horizontal until it reaches a position remote from the head when the roller 45 will again engage the notch 49 to turn the chuck to a vertical position.

Operation of the apparatus is preferably controlled automatically thru a control circuit, one form of which is illustrated diagrammatically in Figure 8. In this circuit the several parts of the apparatus are controlled thru fluid pressure to move the support and chuck forward and back and to engage and disengage the chuck jaws. Figure 8 illustrates a dual system for simultaneously operating two chucks although it will be understood that the control system could be arranged to control any desired number of chucks either simultaneously or successively. Since the two parts of the system as shown in Figure 8 are identical only one part will be described in detail.

Actuating fluid is supplied to the system from a compressor or the like thru a conduit 51 which is connected to a starting valve 52 and to intake ports 53 on a pair of distributor valves 54 and 55. The starting valve is of the on and off type while the distributor valves are four-way fluid controlled valves of any desired construction. The construction shown on the drawing merely by way of example illustrates each distributor valve as including a cylindrical body having the intake ports 53 at the central port thereof. Valve plungers 56 are slidable in the valve bodies being urged to one position by springs 57. Ports 58 at the upper ends of the valve bodies are adapted to conduct fluid thereto to move the plungers down. Each of the plungers is formed with spaced grooves or passages 59 and 61 by which the intake ports 53 may be connected to either of two ports 62 or 63. Exhaust ports 64 in the valve casings which, preferably open to atmosphere, may be connected to the ports 62 and 63 thru the passages 59 and 61.

When no pressure is supplied thru the ports 58 the plungers 56 rise to connect ports 62 to the upper exhaust ports 64 thru passages 59 and to connect ports 63 to ports 53 thru the passages 61. When pressure is supplied thru the ports 58 the plungers will move down to connect the intake ports 53 to the ports 62 thru the passages 59 and to connect ports 63 and 64 thru the passages 61.

The distributor valves are controlled thru relay valves 65 and 66. The relay valves may be of any desired construction which will establish connection at one end when they are exposed to pressure at their opposite ends. As shown the relay valves include cylindrical bodies having pistons 67 slidable therein. The stems of the pistons are formed with ports therethru to establish connections between pipes 68 at their inlet sides which are connected to the supply pipe 51 and the ports 58 of the valves 54 and 55 respectively. When the relay valves are subjected to pressure, the pistons 67 will be forced down to the position shown at the lower part of Figure 8, to establish connections between the supply pipe 51 and the ports 58. When pressure on the relay valves is relieved the pistons will rise to cut off the pipes 68 and vent the ports 58 to atmosphere past slotted or cut away portions of the valve stems, as shown at 60.

The relay valves are controlled thru the starting valve 52 which is connected to the upper parts thereof thru check valves 69. A throttle valve 71 is preferably connected in the line leading to the relay valve 66 so that pressure will build up more slowly in this relay valve than in the relay valve 65 to operate the distributor valve 54 subsequently to the distributor valve 55. It will be noted that opening of the starting valve 52 admits pressure to all four of the relay valves shown in Figure 8 so that they will be operated simultaneously.

The upper part of the relay valve 65 is connected to a relief valve 72 which is normally closed and is adapted to be opened by a cam lever 73 connected to the support 15. The lever 73 is so mounted that when the support is moving away from the head 10 it will open the valve 72 temporarily and will then allow it to close. When the support is moving toward the head the cam lever 73 will pivot and will not open the valve 72.

The upper end of the relay valve 66 is connected to a reversing valve 74 having an operating lever 75 arranged to be engaged by the collar 12 when it is moved outwardly of the head to open the valve 74.

The chuck 21 is controlled by the distributor valve 55 whose port 62 is connected thru a pipe 76 to the passage 29 in the chuck. The port 63 of the valve 55 is connected thru a pipe 77 to the port 28 in the chuck. Thus when the plunger 56 of the valve 55 is in its raised position, the pipe 76 will be vented to atmosphere and the pipe 77 will be connected to the inlet port 53 so that the chuck will be opened. When pressure is supplied to port 58 to force the plunger down, pipe 76 will be connected to the inlet port 53 and pipe 77 will be vented to atmosphere to close the chuck.

The cylinder 17 is connected to the distributor valve 54 to control movement of the support toward and away from the head. For this purpose the port 62 of the valve 54 is connected thru a throttling valve 78 by which the speed of the motor may be regulated through a pipe 79 leading into the rear end of the cylinder 17. The port 63 of the valve 54 is connected thru a pipe 81 and thru a shut-off valve 82 and check valve 83 to the forward end of the cylinder. In order to limit the force which can be exerted by the cylinder the pipes 79 and 81 are connected thru a pressure regulator 84 and a check valve 85. The regulator 84 may be adjusted to limit the differential pressure to any desired value so that an excessive amount of force cannot be exerted on the support and chuck.

In order to control the rate of forward movement of the support the forward end of the cylinder is connected to a pipe 86 thru a check valve 87 to an atmospheric bleed valve 88 which may be adjusted to regulate the rate of exhaust from the forward end of the cylinder. The pipe 86 is also connected thru a shut-off valve 89 and a check valve 91 to the pipe 81 as shown.

The valve 89 is normally closed and is adapted to be held open by an elongated cam 92 carried by the support 15. The cam 92 is of such length and shape that it will hold the valve 89 open until the chuck approaches the head 10 closely enough so that a nipple carried by the chuck is just about to enter the head. Further forward movement of the support will disengage the cam 92 from the valve 89 permitting it to close. It will be noted that when the valve 89 is open fluid from the forward end of the cylinder 17 will exhaust directly to atmosphere thru pipe 86, check valve 87, valve 89, check valve 91, pipe 81, port 63, passage 61 and exhaust port 64. When the valve 89 is closed all of the fluid from the forward end of the cylinder must exhaust thru the restricted valve 88 so that the support will be moved forward more slowly at a rate determined by the opening of the valve 88.

The parts are shown in the upper half of Figure 8 in the position they will occupy when the starting valve 52 is closed and no pressure is supplied to the relay valves 65 and 66. In this position the relay valves close the passages to the ports 58 of the distributor valves 54 and 55 so that the plungers 56 of these valves are in their uppermost positions. At this time, fluid is supplied from the inlet conduit 51 thru the ports 53 and 63 to the pipes 76 to the passages 28 of the chucks to open the chucks. Fluid is also supplied from the inlet ports 53 of the valves 54 and thru the pipes 81 and valves 82 to the forward ends of the cylinder 17 to move the cylinders to their rear-most position. The apparatus is now in condition to receive a blank to be threaded which may be inserted in the chuck and while held therein the starting valve 52 may be temporarily opened. At this time, fluid is supplied to the upper ends of the relay valves 55 and 56 to move them to the positions shown in the lower part of Figure 8. This opens the pipes 68 to the ports 58 of the valves 54 and 55 causing the plungers 56 of these valves to move downwardly to the positions shown. It will be noted that the relay valve 65 will operate prior to the relay valve 66 due to the restriction 71 so that the chuck will be closed before the support starts to move.

With the valves in the position shown in the lower part of Figure 8 the pipe 77 will be supplied with actuating fluid thru the ports 53 and 62 to close the chuck. The rearward end of the cylinder 17 will be supplied with fluid thru the ports 53 and 62 of the valve 54 so that the support will be moved toward the threading head 10. During the initial part of this movement fluid is exhausted from the forward end of the cylinder 17 thru the valve 89 as noted above, while during final movement toward the threading head the valve 89 will be closed so that a slower motion is produced.

Upon completion of the threading operation the valve lever 75 will be moved by the collar 12 to open the reversing valve 74. This vents the upper part of the relay valve 66 to atmosphere allowing the piston 67 to rise and interrupt communication between the pipe 68 and the port 58 of the distributor valve 54. The plunger 56 of the distributor valve will then move upward under the influence of the spring 57 to connect the pipe 79 to atmosphere thru the passage 59 and to connect the pipe 81 to the inlet port 53 thru the port 63 and passage 61. At this time fluid is supplied to the forward end of the cylinder 17 thru the pipe 81 valve 82 and check valve 83 to move the piston and the support 15 rearwardly away from the head 10. Initially this movement will be relatively rapid until a cam 93 carried by the support 15 engages the valve 82 to close it. When this occurs, no additional fluid will be supplied to the right end of the cylinder 17 and the fluid trapped in the cylinder will provide a dashpot effect to stop the motion of the support 15 gradually without shock.

As the support approaches its rearmost position, the cam finger 73 will engage and open the valve 72 to vent the pressure at the upper part of the relay valve 65. The piston 67 of this valve will rise to interrupt communication between pipe 68 and the port 58 of valve 55 so that the plunger 56 of the valve 55 will rise. This will open the pipe 77 to atmosphere thru ports 62 and 64 and passage 59 and will connect pipe 76 to the inlet port 53, thru the passage 61. The chuck will thereupon be released, allowing the threaded nipple to drop by gravity thru the stem 33 into a bin or container and leaving the system in a condition to receive a new blank to be threaded.

For normal rough threading of pipe nipples and the like the nipple may be pulled into the threading head by the action of the chasers thereon assisted by the force of the cylinder 17. For accurate threading operations it is preferred to remove all side load from the threading dies or chasers during the threading operation and to feed the blank into a threading head at a rate proportional to the rate of rotation of the head and the lead of the thread. For this purpose a threaded shaft 94 may be rotatably supported in the base 14 and connected to the shaft 13 thru gears 95. The threaded shaft 94 is adapted to be engaged by a follower 95', formed on the end of a piston rod 96. The piston rod 96 is connected to a piston 97 which is slidable in a cylinder 98 carried by the support 15. Fluid may be supplied to the upper part of the cylinder 98 thru a pipe 99 to move the follower 95 into engagement with the threaded shaft 94 and may be supplied to the lower part of the cylinder 98 thru a pipe 100 to raise the follower out of engagement with the shaft.

As shown in Figure 8, the pipe 99 is connected to the pipe 86 between the check valve 87 and the shut-off valve 88 and the pipe 100 is connected directly to the pipe 81. With this construction when fluid is supplied thru pipe 79 to the rear end of the cylinder 17 to move the support 15 forward and during the time that the valve 89 is open there will be no pressure above the piston 97. When the valve 89 closes, however, pressure will build up behind it due to the restriction offered by the valve 88 and this pressure will be conducted thru the pipe 99 to the upper surface of the piston 97 to move it down and to bring the follower 95 into engagement with the screw 94. At this time the support 15 will be moved positively toward the threading head 10 at a predetermined rate so that the dies in the threading head will not be side loaded and will cut an accurate thread on the nipple.

Upon completion of a threading operation when the reversing valve 74 is opened to reverse the distributor valve 54 pressure will be supplied to the lower part of the piston 97 thru pipes 81 and 100 to raise the piston 97 and move the follower 95 out of engagement with the screw 94. Thus the screw will be disengaged by the follower so that the support 15 can be moved rapidly away from the threading head as described above.

It will be understood that various control systems other than that illustrated in Figure 8 might be derived to carry out the desired cycle of operations embodying fluid actuating means, electrically actuating means or the like. Variations might likewise be made in other parts of the apparatus and in the uses thereof. For example, while the apparatus has been shown and described for threading nipples it could be employed equally well for other threading operations such as threading bolts or screws or internally threading nuts and the like or for various other machining operations. It is accordingly not intended to limit the scope of the invention to the exact apparatus shown nor otherwise than by the terms of the appended claims.

What is claimed is:

1. A chucking and feeding apparatus for use with a machine having a rotatable head comprising a chuck having an opening therein and jaw members to engage a work piece in the opening, a support pivotally mounting the chuck for turning about a horizontal axis, means for moving the support toward and away from the head, a guide plate carried by the chuck including parallel straight end portions and an angular notch, and a pair of spaced guide pins to engage the straight portions to hold the chuck horizontal when the support is adjacent the head, one of the guide pins engaging the sides of the notch to tilt the chuck to a vertical position when the support is remote from the head.

2. A chucking and feeding apparatus for use with a machine having a rotatable head comprising a support movable horizontally toward and away from the head, a chuck pivoted on a horizontal axis on the support, the chuck having a central opening extending completely therethrough of a diameter larger than the work pieces to be machined and jaw members to hold a work piece adjacent one end of the opening, and guide means to hold the chuck in a horizontal position when the support is adjacent the head so that a work piece held by the jaws may be machined and to turn the chuck to a vertical position when the support is remote from the head so that the work piece may drop through the opening when the jaws release it.

3. A chucking and feeding apparatus for use with a machine having a rotatable head comprising a support movable horizontally toward and away from the head, a chuck pivoted on a horizontal axis on the support, the chuck having a central opening extending completely therethrough of a diameter larger than the work pieces to be machined and jaw members to hold a work piece adjacent one end of the opening, guide means to hold the chuck in a horizontal position when it is adjacent the head and in a vertical position when it is remote from the head, and means operated by movement of the support to a position remote from the head to release the jaw members.

4. A chucking and feeding apparatus for use with a machine having a rotatable head comprising a support movable horizontally toward and away from the head, a chuck pivoted on a horizontal axis on the support, the chuck having a central opening extending completely therethrough of a diameter larger than the work pieces to be threaded and jaw members to hold a work piece adjacent one end of the opening, guide means to hold the chuck in a horizontal position when it is adjacent the head and in a vertical position when it is remote from the head, and a control system to first cause the jaw members to engage a work piece, then to move the support toward the head, then to move the support away from the head upon completion of a machining operation, and then to release the jaw members.

5. A chucking and feeding apparatus for use with a machine having a rotatable head comprising a support movable horizontally toward and away from the head, a chuck pivoted on a horizontal axis on the support, the chuck having a central opening extending completely therethrough of a diameter larger than the work pieces to be machined and jaw members to hold a work piece adjacent one end of the opening, guide means to hold the chuck in a horizontal position when it is adjacent the head and in a vertical position when it is remote from the head, fluid actuated means to operate the jaw members, a fluid motor to move the support toward and away from the head, a control valve for the fluid actuated means to cause the jaw members to engage a work piece, a control valve for the motor, means to operate the control valves to cause the jaw members to engage a work piece and the motor to move the support toward the head, reversing means operated by the head on completion of a machining operation to reverse the control valve for the motor, and means operated by the support when it moves to a position remote from the head to reverse the control valve for the fluid actuated means.

6. A chucking and feeding apparatus for use with a machine having a rotatable head comprising a support movable horizontally toward and away from the head, a chuck pivoted on a horizontal axis on the support, the chuck having a central opening extending completely therethrough of a diameter larger than the work pieces to be machined and jaw members to hold a work piece adjacent one end of the opening, guide means to hold the chuck in a horizontal position when it is adjacent the head and in a vertical position when it is remote from the head, fluid actuated means to operate the jaw members, a fluid motor to move the support toward and away from the head, a control valve for the fluid actuated means to cause the jaw members to engage a work piece, a control valve for the motor, means to operate the control valves to cause the jaw members to engage a work piece and the motor to move the support toward the head, a speed control valve controlling the motor and operated by the support as it approaches the head to control the speed of motion of the support toward the head, reversing means operated by the head on completion of a machining operation to reverse the control valve for the motor, and means operated by the support when it moves to a position remote from the head to reverse the control valve for the fluid actuated means.

7. A chucking and feeding apparatus for use with a machine having a rotatable head comprising a support movable toward and away from the head, a chuck on the support to hold a work piece to be machined, a fluid motor to move the support toward and away from the head, a threaded shaft driven at a speed proportional to the speed of the head, a follower member carried by the support and movable into and out of engagement with the threaded shaft, a fluid motor on the support to move the follower member, and means operated by movement of the support toward the head to control the last named fluid motor.

8. A chucking and feeding apparatus for use with a machine having a rotatable head comprising a support movable toward and away from the head, a chuck on the support to hold a work piece to be machined, a fluid motor to move the support toward and away from the head, a threaded shaft driven at a speed proportional to the speed of the head, a follower member carried by the support and movable into and out of engagement with the threaded shaft, a fluid motor on the support to move the follower member, means operated by movement of the support to a position adjacent the head to operate the last named fluid motor to move the follower member into engagement with the threaded shaft, and a connection to supply fluid to the last named fluid motor to move the follower member out of engagement with the threaded shaft when the first named fluid motor is energized to move the support away from the head.

9. A chucking and feeding apparatus for use with a machine having a rotatable head comprising a support movable toward and away from the head, a chuck on the support to hold a work piece to be machined, a fluid motor to move the support toward and away from the head, a threaded shaft driven at a speed proportional to the speed of the head, a follower member carried by the support and movable into and out of engagement with the threaded shaft, and fluid motor on the support to move the follower member, valve means operated by movement of the support toward the head simultaneously to reduce the speed of the first named fluid motor and to actuate the last named fluid motor to move the follower member into engagement with the threaded shaft, and a connection to supply fluid to the last named fluid motor to move the follower member out of engagement with the shaft when the first named fluid motor is energized to move the support away from the head.

10. In a chucking and feeding apparatus for use with a threading machine, a chuck comprising a hollow body, a piston slidable in the body, a tubular stem connected to the piston and extending thru the body and of larger internal diameter than the work pieces to be threaded, a series of jaws connected to the stem to be moved therewith, the jaws and the body being formed with cam portions to cam the jaws inward when they are moved longitudinally by the stem, grippers carried by the jaws for limited longitudinal movement relative thereto and formed with threaded portions to engage the threaded end of a work piece, and springs urging the grippers toward a central position relative to the jaws.

11. In a chucking and feeding apparatus for use with a threading machine, a chuck comprising a hollow body, a piston slidable in the body, a tubular stem connected to the piston and extending thru the body and of larger internal diameter than the work pieces to be threaded, a series of jaws connected to the stem to be moved therewith, the jaws and the body being formed with cam portions to cam the jaws inward when they are moved longitudinally by the stem, grippers carried by the jaws for limited longitudinal movement relative thereto and formed with threaded portions to engage the threaded end of a work piece, springs urging the grippers toward a central position relative to the jaws, and inwardly projecting stop shoulders on the grippers at the inner ends of the threaded portion to limit inward movement of a threaded work piece end in the threaded portions.

12. In a chucking and feeding apparatus for use with a threading machine, a chuck comprising a hollow body, a piston slidable in the body, a tubular stem connected to the piston and extending thru the body and of larger internal diameter than the work piece to be threaded, a series of jaws connected to the stem to be moved therewith, the jaws and the body being formed with cam portions to cam the jaws inward when they are moved longitudinally by the stem, grippers carried by the jaws for limited longitudinal movement relative thereto and formed with threaded portions to engage the threaded end of a work piece, springs urging the grippers toward a central position relative to the jaws, inwardly projecting stop shoulders on the grippers at the inner ends of the threaded portions to limit inward movement of a threaded work piece end in the threaded portions, and a support pivotally supporting the chuck body for turning movement about a horizontal axis.

13. In a chucking and feeding apparatus for use with a threading machine having a rotatable threading head, a support movable toward and away from the head, a chuck on the support to hold a work piece to be threaded, a fluid motor having a movable part to move the support toward the head, a threaded shaft driven at a speed proportional to the speed of the head, a follower carried by the support and movable into and out of engagement with the shaft, and yielding means connecting said part of the fluid motor and the support whereby the shaft can move the support at a different rate than the motor moves.

14. A chucking and feeding apparatus for use with a machine having a head rotating on a fixed axis comprising a frame, a support movable on the frame toward and away from the head in a path parallel to the axis of rotation of the head, a chuck pivotally mounted on the support for pivotal movement about an axis transverse to the path of movement of the support from a position aligned with the head to a position transverse to the head axis, means for moving the support toward and away from the head, and cooperating cam parts carried by the chuck and the frame to turn the chuck on the support as the support moves toward and away from the head, one of said parts including a cam surface having a straight portion to hold the chuck parallel to the path of movement of the support and another portion lying at an angle to the straight portion to turn the chuck and the other of said parts including a follower engageable with said surface.

15. A chucking and feeding apparatus for use with a machine having a head rotating on a fixed axis comprising a frame, a support movable on the frame toward and away from the head in a path parallel to the axis of rotation of the head, a chuck pivotally mounted on the support for pivotal movement about an axis transverse to the path of movement of the support from a position aligned with the head to a position transverse to the head axis, the chuck having an opening therethrough of a diameter larger than work pieces to be fed through which the work pieces may pass and clamp jaws adjacent one end of the opening to grip a work piece, means for moving the support toward and away from the head, and cooperating cam parts carried by the chuck and the frame to turn the chuck on the support as the support moves toward and away from the head, one of said parts including a cam surface having a straight portion to hold the chuck parallel to the path of movement of the support and another portion lying at an angle to the straight portion to turn the chuck and the other of said parts including a follower engageable with said surface.

DONALD D. R. MACKINTOSH.

REFERENCES CITED

The following references are of record in the file of this patent:

UNITED STATES PATENTS

| Number | Name | Date |
|---|---|---|
| 396,988 | Daly | Jan. 29, 1889 |
| 691,199 | Stephans | Jan. 14, 1902 |
| 1,085,697 | Neckerman et al. | Feb. 3, 1914 |
| 1,299,883 | Warren | Apr. 8, 1919 |
| 1,444,109 | Clay | Feb. 6, 1923 |
| 1,783,539 | Hogg | Dec. 2, 1930 |
| 1,814,362 | Booth | July 14, 1931 |
| 2,059,753 | Scott et al. | Nov. 3, 1936 |
| 2,176,676 | Lupo | Oct. 7, 1939 |
| 2,187,297 | Baker | Jan. 16, 1940 |
| 2,318,177 | Mathias | May 4, 1943 |
| 2,340,874 | Garand | Feb. 8, 1944 |

FOREIGN PATENTS

| Number | Country | Date |
|---|---|---|
| 457,927 | Germany | Mar. 29, 1928 |